United States Patent [19]

Kobayashi

[11] Patent Number: 5,371,155

[45] Date of Patent: Dec. 6, 1994

[54] FLUOROSILICONE RESIN AND CURABLE FLUOROSILICONE RESIN COMPOSITION

[75] Inventor: Hideki Kobayashi, Chiba, Japan

[73] Assignee: Dow Corning Toray Silicone co., Ltd., Tokyo, Japan

[21] Appl. No.: 70,062

[22] Filed: Jun. 1, 1993

[30] Foreign Application Priority Data

Jun. 18, 1992 [JP] Japan .................................. 4-184321

[51] Int. Cl.$^5$ ............................................ C08G 77/24
[52] U.S. Cl. ..................................... 525/477; 528/34; 528/42
[58] Field of Search ................... 528/34, 42; 525/477

[56] References Cited

U.S. PATENT DOCUMENTS

| | | | |
|---|---|---|---|
| 3,255,131 | 6/1966 | Ahlbrecht et al. | 525/445 |
| 3,328,349 | 6/1967 | Lentz | 260/46.5 |
| 3,453,232 | 7/1969 | Larson | 528/42 |
| 3,620,992 | 11/1971 | Kim et al. | 528/34 |
| 3,666,830 | 5/1972 | Alekna | 525/477 |
| 4,024,306 | 5/1977 | Takamizawa et al. | 427/387 |
| 4,267,297 | 5/1981 | Hanada et al. | 528/18 |

FOREIGN PATENT DOCUMENTS 48245 4/1980 Japan .
140280 8/1984 Japan .

*Primary Examiner*—Melvyn I. Marquis
*Assistant Examiner*—Margaret W. Glass
*Attorney, Agent, or Firm*—Alexander Weitz

[57] ABSTRACT

A curable fluorosilicone resin composition is disclosed, which composition comprises (A) 100 parts by weight of a fluorosilicone resin consisting essentially of $F(CF_2)_aCH_2CH_2SiO_{3/2}$ siloxane units and, optionally, $R_bSiO_{(4-b)/2}$ siloxane units, wherein R is a substituted or unsubstituted monovalent hydrocarbon group having 1 to 8 carbon atoms, a is an integer with a value of at least 4 and b is an integer with a value of 0 to 3, with the proviso that when said fluorosilicone resin contains said $R_bSiO_{(4-b)/2}$ siloxane units, the ratio of said $F(CF_2)_aCH_2CH_2SiO_{3/2}$ siloxane units to said $R_bSiO_{(4-b)/2}$ siloxane units is at least 1;

(B) 1 to 90 parts by weight of a component selected from the group consisting of an organosilane and its partial hydrolysis product, said organosilane having the general formula $R^1_cSiX_{4-c}$ wherein $R^1$ is a substituted or unsubstituted monovalent hydrocarbon group having 1 to 8 carbon atoms, c is 0, 1, or 2 and X is a hydrolyzable group; and (c) a sufficient amount of a condensation catalyst to accelerate the cure of said fluorosilicone resin composition.

16 Claims, No Drawings

FLUOROSILICONE RESIN AND CURABLE FLUOROSILICONE RESIN COMPOSITION

FIELD OF THE INVENTION

The present invention relates to a novel fluorosilicone resin and to a curable fluorosilicone resin composition that is based thereon.

BACKGROUND OF THE INVENTION

A large number of organopolysiloxane resin-based compositions that cure to form water-repellent films are already known. For example, Japanese Patent Application Laid Open Number Sho 55-48245 discloses a composition of hydroxyl-containing methylpolysiloxane resin, alpha,omega-dihydroxydiorganopolysiloxane, and organosilane. This composition cures to form a water-repellent film that has excellent release and anti-stain properties. Japanese Patent Application Laid Open Number Sho 59-140280 discloses a composition based on the partial cohydrolysis condensation product from an organosilane mixture whose main components are perfluoroalkyl-containing organosilane and amino-containing organosilane. This composition cures to form a film having a good water repellency and oil repellency.

SUMMARY OF THE INVENTION

While the aforesaid compositions do develop water repellency or both water repellency and oil repellency, they do not provide both a high level of water repellency and a high level of oil repellency and therefore cannot be used in applications that require higher levels of both water repellency and oil repellency. The present invention takes as its objects the introduction of a novel fluorosilicone resin and the introduction of a fluorosilicone resin composition that is based on this novel fluorosilicone resin and that cures at room temperature to form a highly water-repellent, highly oil-repellent film.

The present invention therefor relates to a fluorosilicone resin composition comprising (A) 100 weight parts of a fluorosilicone resin that contains 0.01 to 10.0 weight % silicon-bonded hydroxyl groups and that is represented by the average unit formula

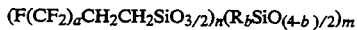

wherein R is a $C_1$ to $C_8$ substituted or unsubstituted monovalent hydrocarbon group, a is an integer with a value of at least 4, b is an integer with a value of 0 to 3, n is a number greater than 0, m is a number $\geq 0$, and n/m is a number $\geq 1$ where m is not zero;

(B) 1 to 90 weight parts of a organosilane with the general formula

or its partial hydrolysis condensate, wherein $R^1$ is a $C_1$ to $C_8$ substituted or unsubstituted monovalent hydrocarbon group, c is 0, 1, or 2, and X is a hydrolyzable group; and (C) a condensation-reaction-accelerating catalyst.

DETAILED DESCRIPTION OF THE INVENTION

The fluorosilicone resin (A) of the present invention is represented by the following average unit formula.

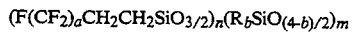

The fluorosilicone resin thus consists essentially of $F(CF_2)_aCH_2CH_2SiO_{3/2}$ siloxane units and, optionally, $R_bSiO_{(4-b)/2}$ siloxane units, wherein the ratio of the former to the latter units is at least one. In the above formulae, R represents $C_1$ to $C_8$ substituted and unsubstituted monovalent hydrocarbon groups and is nonexhaustively exemplified by alkyl groups such as methyl, ethyl, propyl, and octyl; alkenyl groups such as vinyl, allyl, and hexenyl; aryl groups such as phenyl; and the 3,3,3-trifluoropropyl group. Methyl is preferred among the preceding. Further, a is an integer with a value of at least 4 and is exemplified by 4, 6, and 8. b is an integer with a value of 0 to 3, n is a number greater than zero and m is a number $\geq 0$. When there are $R_bSiO_{(4-b)/2}$ siloxane units in the resin (i.e., when there are $R_bSiO_{(4-b)/2}$ siloxane units in the resin (i.e., when m>0), the ratio n/m is equal to or greater than one.

The fluorosilicone resin of the present invention may be synthesized, for example, by the following methods. Thus for the case where m=0, it may be synthesized by the hydrolysis of perfluoroalkyl-containing organosilane with the general formula

in which a is defined as above and Y is a hydrolyzable group such as a halogen atom (e.g., chlorine, bromine) or an alkoxy group (e.g., methoxy, ethoxy, propoxy, butoxy). When m does not equal zero, the fluorosilicone resin of the present invention may be synthesized by the cohydrolysis in organic solvent and aqueous acid of a perfluoroalkyl-containing organosilane with the same general formula as above and an organosilane with the general formula $R_bSiY_{4-b}$, in which R, b, and Y are defined as above. This cohydrolysis may be conducted, for example, by dissolving the organosilane mixture inorganic solvent and either dripping this solution into stirred aqueous acid or dripping aqueous acid into the stirred organic solvent solution. Organic solvent or water is subsequently added to the fluorosilicone resin product, and the aqueous layer is separated after quiescence. The fluorosilicone resin-containing organic solvent layer is washed with water to neutrality, and a water elimination step is then preferably carried out. Although not explicitly shown in the above formula, the fluorosilicone resin afforded by these procedures will contain residual silicon-bonded hydroxyl groups, and the content of silicon-bonded hydroxyl groups will generally be 0.01 to 10.0 weight %. Preferred fluorosilicone resin of the present invention contains 0.1 to 4.0 weight % residual silicon-bonded hydroxyl groups.

The organic solvent used for synthesis of the fluorosilicone resin of the present invention preferably is capable of dissolving both the starting organosilane and the fluorosilicone resin product. Such organic solvents are exemplified by ethers such as diethyl ether, tetrahydrofuran, etc.; ketones such as acetone, methyl isobutyl ketone, etc.; halogenated hydrocarbons such as 1,1,1-trichloroethane, dichloroethane, alpha, alpha,alpha-trifluorotoluene, hexafluoroxylene, 1,1,2-trichlorotrifluoroethane, etc.; and HCFC organic solvents such as CHCl$_2$CF$_3$ and CH$_3$CCl$_2$F.

The organic solvent should generally be used in quantities that give concentrations of 10 to 80 weight % for the fluorosilicone resin product.

The aqueous acid comprises the aqueous solution of an acid such as sulfuric acid, nitric acid, hydrochloric acid, and so forth, aqueous hydrochloric acid solutions being preferred. In the particular case of aqueous hydrochloric acid solutions, the hydrogen chloride concentration is preferably at least 5 weight %. Suitable temperatures during and after addition fall into the range of 0° C. to 120° C.

The organosilane, or partial hydrolysis condensate thereof, comprising the component (B) used in the composition of the present invention functions as a cross-linker. R$^1$ in the above formula comprises C$_1$ to C$_8$ substituted or unsubstituted monovalent hydrocarbon groups and is specifically but nonexhaustively exemplified by alkyl groups such as methyl, ethyl, tert-butyl and 2-ethylhexyl; alkenyl groups such as vinyl, allyl, and hexadienyl; cycloalkyl groups such as cyclopentyl and cyclohexyl; cycloalkenyl groups such as cyclopentenyl and cyclohexenyl; aryl groups such as phenyl; aralkyl groups such as benzyl, phenylethyl, and xylyl; alkaryl groups such as tolyl and dimethylphenyl; halogenated hydrocarbon groups such as chloromethyl and chloropropyl; and fluoroalkyl groups such as 3,3,3-trifluoropropyl and F(CF$_2$)$_x$CH$_2$CH$_2$— groups where x is 4, 5 or 6. Methyl and vinyl are preferred among the preceding. In the above formula, c is to have a value of 0, 1, or 2, but 1 is preferred. X is a hydrolyzable group and is specifically but nonexhaustively exemplified by diorganoketoxime groups such as dimethyl ketoxime and methyl ethyl ketoxime; alkoxy groups such as methoxy and ethoxy; acyloxy groups such as acetoxy; N-organoamido groups such as methylacetamido; N,N-diorganoamino groups such as N,N-diethylamino; N-organoamino groups such as N-butylamino; N,N-diorganohydroxylamino groups such as N,N-diethylhydroxylamino; and alkenyloxy groups such as propenoxy. The organosilane under consideration is itself exemplified by methyltri(methyl ethyl ketoxime)silane, methyltri(dimethyl ketoxime)silane, methyltri(diethyl ketoxime)silane, methyltrimethoxysilane, vinyltrimethoxysilane, methyltriethoxysilane, vinyltriethoxysilane, ethyl orthosilicate, propyl orthosilicate, methyltri(N,N-dimethylamino)silane, methyltri(N,N-diethylamino)silane, methyltri(N-methylacetamido)silane, vinyltri(N-ethylacetamido)silane, methyltri(N,N-dimethylaminoxy)silane, and methyltri(N,N-diethylaminoxy)silane.

Component (B) should be present at 1 to 90 weight parts per 100 weight parts of component (A). Based on a consideration of the quantity of silicon-bonded hydroxyl groups from component (A) and the content of moisture-hydrolyzable groups in component (B), the particular quantity of addition for component (B) should be selected so as to provide long-term storability in the absence of moisture and curability at room temperature in the presence of moisture.

The condensation-reaction-accelerating catalyst comprising the component (C) used in the present invention is added in order to accelerate the cure of the composition of the present invention. Catalysts of the dehydrative condensation of silanol groups are generally effective as the catalyst under consideration. This component is specifically but nonexhaustively exemplified by the tin salts of carboxylic acids such as dibutyltin acetate, dibutyltin laurate, dibutyltin dioctoate, stannous octoate, stannous naphthenate, stannous oleate, stannous isobutyrate, stannous linoleate, stannous stearate, stannous benzoate, stannous naphthoate, stannous laurate, stannous beta-benzoylpropionate, stannous crotonate, stannous p-bromobenzoate, stannous palmitoleate, stannous cinnamate, and stannous phenylacetate; the iron salts, manganese salts, and cobalt salts of the preceding carboxylic acids; tetraalkyl titanates; the complex salts of dialkyl titanates; and organosiloxy titanates. A catalyst should be used that is adapted to the type of hydrolyzable group occurring in component (B). The amount of catalyst to be employed should be sufficient to accelerate the cure of the composition and can be determined by routine experimentation.

The composition of the present invention is prepared simply by mixing components (A), (B), and (C) to homogeneity under moisture free conditions. The curable fluorosilicone resin composition of the present invention is preferably diluted with organic solvent when it is to be used as a coating. Organic solvents operative for this purpose are exemplified by the same organic solvents as used for synthesis of the fluorosilicone resin. The dilution ratio may be chosen as desired based on a consideration of the workability or processability.

With the objective of obtaining a further improvement in adhesion by the composition of the present invention for different types of substrates, the various silane coupling agents known as adhesion promoters may be added to the composition of the present invention insofar as the object of the present invention is not impaired. Silane coupling agents useable for this purpose are exemplified by the following compounds.

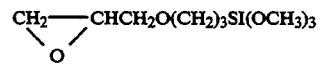

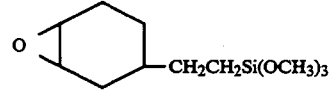

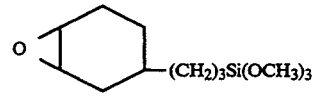

These silane coupling agents may be used singly or in combinations of two or more. The silane coupling agent should be added at 0.01 to 10.0% based on the weight of the composition of the present invention.

The curable fluorosilicone resin composition of the present invention as described hereinbefore cures at room temperature to form a film that is both highly water repellent and highly oil repellent or oleophobic. In addition, this film is also very stain resistant, thermostable, and weatherproof and has good chemical resistance. As a consequence, it is useful in the various applications where such properties are critical. For example, it may be effectively used as a coating that resists adhesion by water droplets, snow, and ice, as a stain-resistant coating, and as a nonstick or release coating.

EXAMPLES

The present invention is explained in greater detail below through illustrative examples. In the examples, "parts" represents "weight parts" and Me represents the methyl group. The water repellency was evaluated by measuring the water contact angle, and the oil repellency was evaluated by measuring the n-hexadecane contact angle.

EXAMPLE 1

A mixture of 19.3 g of $C_4F_9CH_2CH_2SiCl_3$ and 0.96 g of $Me_2SiCl_2$ dissolved in 14 g of Freon ™ 113 was dripped at room temperature into a stirred mixture of 2.7 g of water, 3 g of isopropanol, and 10 g of Freon ™ 113. Stirring was continued for an additional 2 hours after the completion of addition. Fifty g of water was subsequently added, and the reaction mixture was stirred for 5 minutes and then allowed to stand. The reaction mixture separated into two layers and the organic layer was collected. Sixty g of Freon ™ 113 and 60 g of water were added to the organic layer, and it was repeatedly washed with water after adjusting the pH to 7 with 4 weight % aqueous sodium bicarbonate. The organic layer was again collected and the solvent was removed at reduced pressure to yield a fluorosilicone resin in the liquid state at room temperature.

This fluorosilicone resin was analyzed by GPC using Freon ™ 113 as eluent with the following results: weight-average molecular weight $(M_w)=4,730$, number-average molecular weight $(M_n)=3,940$, and dispersity $=1.20$.

The results of $^{29}Si$-NMR analysis of this fluorosilicone resin are reported below.

| delta (ppm) | |
|---|---|
| $-18$ | (1Si, br, $Me_2SiO_{2/2}$) |
| $-55 \sim -59$ | (2.1Si, br, $HO(C_4F_9C_2H_4)SiO_{2/2}$) |
| $-66 \sim -68$ | (4.9Si, br, $(C_4F_9C_2H_4)SiO_{3/2}$) |

These measurement results confirmed the structure reported below for this fluorosilicone resin, which also contained 1.4 weight % silicon-bonded hydroxyl groups.

$(C_4F_9C_2H_4SiO_{3/2})_{12.2}(Me_2SiO_{2/2})_{1.8}$

EXAMPLE 2

A mixture of 26.67 g of $C_4F_9CH_2CH_2SiCl_3$ and 4.49 g of $MeSiCl_3$ dissolved in 17 g of Freon ™ 113 was dripped at room temperature into a stirred mixture of 5.4 g of water, 6 g of isopropanol, and 40 g of Freon ™ 113. Stirring was continued for an additional 2 hours after the completion of addition. Fifty g of hot water was subsequently added, and the reaction mixture was stirred for 5 minutes and then allowed to stand. The reaction mixture separated into two layers and the organic layer was collected. Sixty g of Freon ™ 113 and 80 g of water were added to the organic layer, and it was repeatedly washed with water after adjusting the pH to 7 with 4 weight % aqueous sodium bicarbonate. The organic layer was again collected and the solvent was removed at reduced pressure to yield 22.53 g (yield=98%) of a fluorosilicone resin in the liquid state at room temperature.

This fluorosilicone resin was analyzed by GPC using Freon ™ 113 as eluent with the following results: weight-average molecular weight $(M_w)=2,400$, number-average molecular weight $(M_w)=1,690$, and dispersity $=1.42$.

Based on the results for the yield and $^{29}Si$-NMR analysis, this fluorosilicone resin was confirmed to be fluorosilicone resin with the average unit formula given below, which also contained residual silicon-bonded hydroxyl groups.

$(C_4F_9C_2H_4SiO_{3/2})_{5.5}(MeSiO_{3/2})_{0.7}$

EXAMPLE 3

A mixture of 38 g of $C_4F_9CH_2CH_2SiCl_3$ and 1.7 g of $Si(OEt)_4$ dissolved in 32 g of Freon ™ 113 was dripped at room temperature into a stirred mixture of 5.4 g of water, 6 g of isopropanol, and 40 g of Freon ™ 113. Stirring was continued for an additional 2 hours after the completion of addition. Fifty grams of hot water was subsequently added, and the reaction mixture was stirred for 5 minutes and then allowed to stand. The reaction mixture separated into two layers and the organic layer was collected. Sixty g of Freon ™ 113 and 80 g of water were added to the organic layer, and it was repeatedly washed with water after adjusting the pH to 7 with 4 weight % aqueous sodium bicarbonate. The organic layer was again collected and the solvent was removed at reduced pressure to yield 29.4 g (yield=97%) of a fluorosilicone resin in the liquid state at room temperature.

This fluorosilicone resin was analyzed by GPC using Freon ™ 113 as eluent with the following results: weight-average molecular weight $(M_w)=2,100$, number-average molecular weight $(M_n)=1,320$, and dispersity $=1.59$.

Based on the results for the yield and $^{29}Si$-NMR analysis, this fluorosilicone resin was confirmed to be the compound with the average unit formula reported below. This fluorosilicone resin had a silicon-bonded hydroxyl group content of 1.9%.

$(C_4F_9C_2H_4SiO_{3/2})_{4.34}(SiO_{4/2})_{0.35}$

EXAMPLE 4

Ten g of the fluorosilicone resin prepared in Example 1 (silicon-bonded hydroxyl group content=1.4 weight %) was dissolved in 100 g of Freon ™ 113. To this solution were then added 0.3 g of methyltri(methyl ethyl ketoxime)silane and 0.02 g of dibutyltin diacetate to prepare a homogeneous solution. A cured film was prepared by coating this liquid mixture on a flat, smooth glass plate and curing by standing for 1 week at room temperature. The contact angles were measured on this cured film. These measurements were carried by the liquid droplet method using a contact angle meter from Kyowa Kaimen Kagaku Kabushiki Kaisha (Japan). The reported contact angle is the average value of measurements on n=10 droplets. The results were as follows: water contact angle=111 degrees; n-hexadecane contact angle=68 degrees.

EXAMPLE 5

Ten g of the fluorosilicone resin prepared in Example 3 (silicon-bonded hydroxyl group content=1.9 weight %) was dissolved in 100 g of Freon ™ 113. To this solution were then added 0.38 g of methyltri(methylethylketoxime)silane, 0.02 g of dibutyltin diacetate, and 0.01 g of aminoethylaminopropyltrimethoxysilane to prepare a homogeneous solution. A cured film was prepared by coating this liquid mixture on a flat, smooth glass plate and curing by standing for 1 week at room temperature. The contact angles were measured on this cured film, as described above. The results were as follows: water contact angle=113 degrees; n-hexadecane contact angle=67 degrees.

That which is claimed is:

1. A curable fluorosilicone resin composition comprising:
   (A) 100 parts by weight of a fluorosilicone resin which has from 0.01 to 10.0 weight percent silicon-bonded hydroxyl groups and consists essentially of $F(CF_2)_aCH_2CH_2SiO_{3/2}$ siloxane units and, optionally, $R_bSiO_{(4-b)/2}$ siloxane units, wherein R is a substituted or unsubstituted monovalent hydrocarbon group having 1 to 8 carbon atoms, a is an integer with a value of at least 4 and b is an integer with a value of 0 to 3, with the proviso that when said fluorosilicone resin contains said $R_bSiO_{(4-b)/2}$ siloxane units, the ratio of said $F(CF_2)_aCH_2CH_2SiO_{3/2}$ siloxane units to said $R_bSiO_{(4-b)/2}$ siloxane units is at least 1;
   (B) 1 to 90 parts by weight of a component selected from the group consisting of an organosilane and its partial hydrolysis product, said organosilane having the general formula $R^1_cSiX_{4-c}$ wherein $R^1$ is a substituted or unsubstituted monovalent hydrocarbon group having 1 to 8 carbon atoms, c is 0, 1, or 2 and X is a hydrolyzable group;
   (C) a sufficient amount of a condensation catalyst to accelerate the cure of said fluorosilicone resin composition, said catalyst being selected from the group consisting of the carboxylic acid salts of tin, iron, manganese and cobalt, the complex salts of dialkyl titanates and organosiloxy titanates; and, optionally,
   (D) 0.01 to 10 percent of a silane coupling agent based on the total weight of said fluorosilicone resin composition.

2. The composition according to claim 1, wherein a of said $F(CF_2)_aCH_2CH_2SiO_{3/2}$ siloxane units is 4 to 8.

3. The composition according to claim 2, wherein R of said $R_bSiO_{(4-b)/2}$ siloxane units is a methyl radical.

4. The composition according to claim 3, wherein $R^1$ of said said organosilane is selected from the group consisting of a methyl radical and a vinyl radical.

5. The composition according to claim 4, wherein X of said organosilane (B) is selected from the group consisting of diorganoketoxime groups and alkoxy groups.

6. The composition according to claim 1, wherein said fluorosilicone resin (A) contains 0.1 to 4 weight percent silicon-bonded hydroxyl groups.

7. The composition according to claim 6, wherein a of said $F(CF_2)_aCH_2CH_2SiO_{3/2}$ siloxane units is 4.

8. The composition according to claim 7, wherein R of said $R_bSiO_{(4-b)/2}$ siloxane units is a methyl radical.

9. The composition according to claim 8, wherein $R^1$ of said organosilane is selected from the group consisting of a methyl radical and a vinyl radical.

10. The composition according to claim 9, wherein X of aid organosilane (B) is selected from the group consisting of dimethyl ketoxime, methyl ethyl ketoxime, methoxy and ethoxy.

11. The composition according to claim 1, wherein a of said $F(CF_2)_aCH_2CH_2SiO_{3/2}$ siloxane units is 4.

12. The composition according to claim 1, wherein X of said organosilane is a diorganoketoxime group.

13. The composition according to claim 11, wherein X of said organosilane is a diorganoketoxime group.

14. The composition according to claim 12, wherein a of said $F(CF_2)_aCH_2CH_2SiO_{3/2}$ siloxane units is 4 to 8.

15. The composition according to claim 14, wherein R of said $R_bSiO_{4-b/2}$ siloxane units is a methyl radical.

16. The composition according to claim 15, wherein $R^1$ of said organosilane is selected from the group consisting of a methyl radical and a vinyl radical.

* * * * *